United States Patent [19]

Blaul

[11] 4,055,208
[45] Oct. 25, 1977

[54] LOCKING FASTENER DEVICE
[75] Inventor: John Joseph Blaul, Arlington Heights, Ill.
[73] Assignee: Illinois Tool Works Inc., Chicago, Ill.
[21] Appl. No.: 724,789
[22] Filed: Sept. 20, 1976
[51] Int. Cl.$^2$ ............................................. F16B 39/32
[52] U.S. Cl. ............................................ 151/37; 151/41
[58] Field of Search ................. 151/41, 39, 40, 37, 151/35, 38, 34

[56] References Cited

U.S. PATENT DOCUMENTS

| 594,918 | 12/1897 | Sweeney | 151/39 |
|---|---|---|---|
| 1,784,142 | 12/1930 | Hosking | 151/35 UX |
| 1,924,695 | 8/1933 | Olson | 151/37 |
| 2,006,359 | 7/1935 | Lackner | 151/39 |
| 3,258,047 | 6/1966 | Loretan | 151/35 |
| 3,275,055 | 9/1966 | Gutshall | 151/41 X |
| 3,342,235 | 9/1967 | Pylypyshyn | 151/37 |
| 3,527,279 | 9/1970 | Sparks | 151/37 X |
| 3,540,509 | 11/1970 | Gutshall | 151/37 |

FOREIGN PATENT DOCUMENTS 958,560  9/1949  France ............................ 151/35

Primary Examiner—Ramon S. Britts
Attorney, Agent, or Firm—Thomas W. Buckman; Robert W. Beart

[57] ABSTRACT

A rotary threaded fastener and twisted tooth lock washer assembly providing a ratchet-type locking action due to the inter-engagement of the twisted teeth on the lock washer and cogs formed on the bearing surface of the threaded fastener. The teeth are configured to be frustoconical in composite on the lock washer body with each tooth being of a transverse cross-sectional configuration which includes an upturned radial edge adjacent and interacting with the cogs in order to greatly increase the resistance to unauthorized loosening of the assembly.

2 Claims, 7 Drawing Figures

U.S. Patent  Oct. 25, 1977  4,055,208
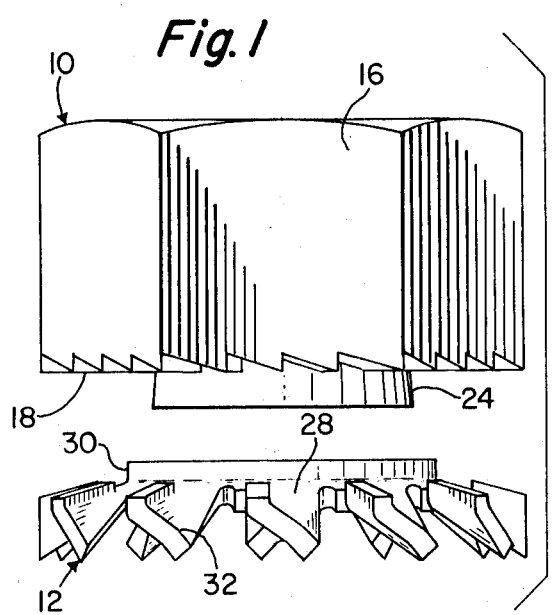
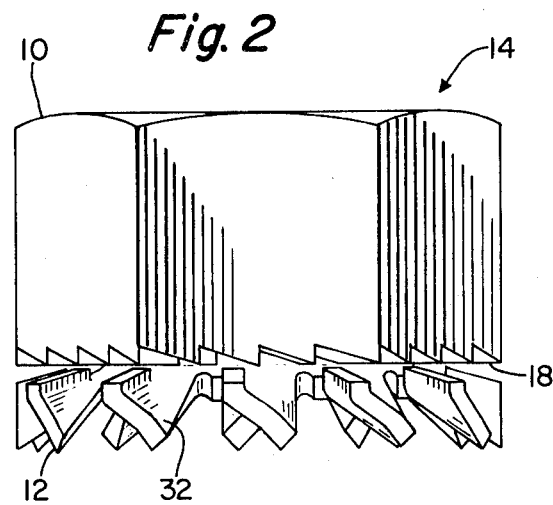
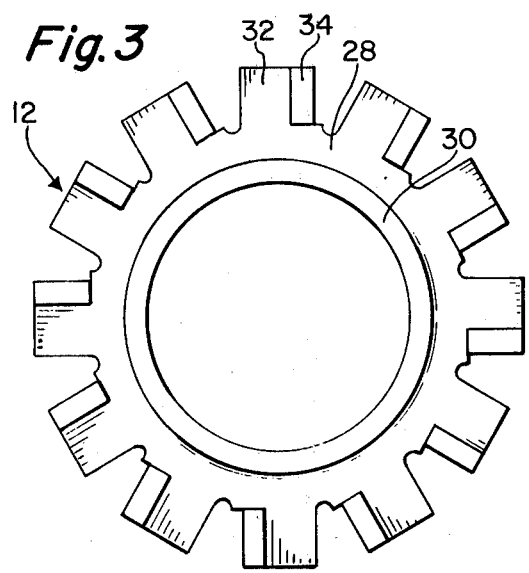
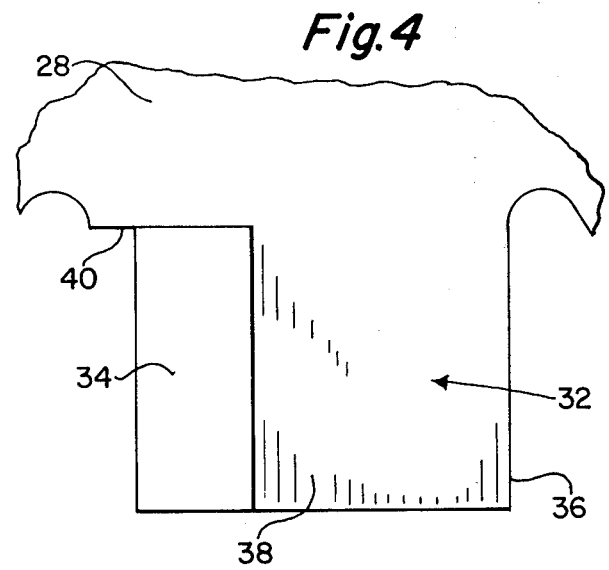
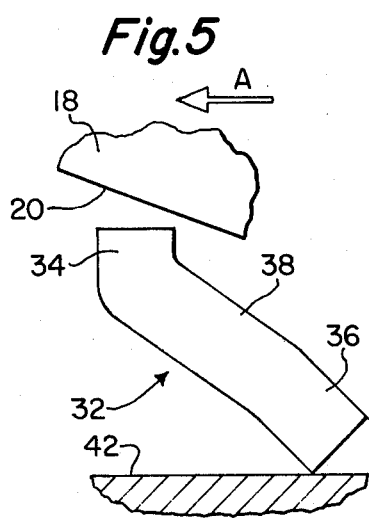
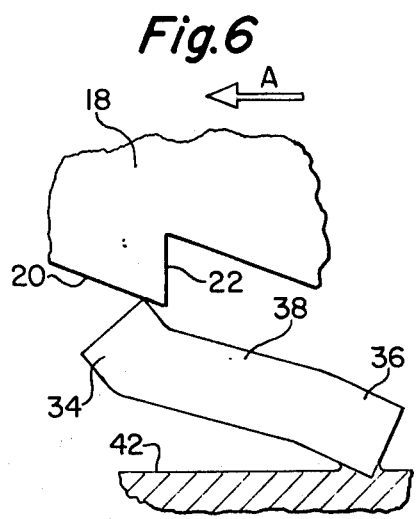
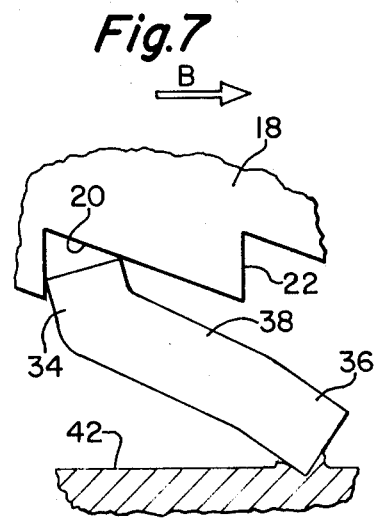

LOCKING FASTENER DEVICE

The invention relates generally to fastener devices and particularly to fastener devices consisting of cooperating fastener elements, such as a rotary threaded fastener and a lock washer disposed in operative association with the clamping surface thereof.

More specifically, the present invention contemplates a fastener device composed of a rotary threaded fastener, such as a screw element or nut element, and a lock washer which will interlock therewith to increase the locking effectiveness of the associated parts in resisting unauthorized retrograde rotation of the clamping surface.

The present invention has special significance in fastener units of the type described which utilize tooth-type washers including a pair of opposing work engaging and locking margins in conjunction with cogs formed on the bearing surface of the rotary fastener member.

Typical assemblies of this type include conventional twisted tooth washers which are designed to deflect the teeth downwardly upon the urging of a camming surface of a cog rotated over the washer and which permits the teeth to ratchet or snap upwardly into the valley of the cog surface. When the teeth are in the valleys, an abutting engagement is created between the upper work engaging and locking margin of the tooth and the cog.

Devices of the type described quite often do not achieve a maximum use of the springs in the system since the teeth are permitted to release a great portion of their energy as they are sprung into locking or abutting engagement with the cog. Furthermore, conventional tooth design creates a strut action, which may become jarred loose since there is no substantial resilience in the strut when subjected to forces exerted laterally on the teeth.

The present invention incorporates a novel design for a tooth on a twisted tooth lock washer which includes at least one longitudinally or radially extending locking margin of the tooth formed out of the plane of the remaining portion of the tooth. The invention shows such a formation wherein the locking margin adjacent the bearing surface of the fastener member is deformed upwardly so as to present a marginal surface thereof extending generally perpendicular to the bearing surface. The cogs are formed so as to include a ramp portion and a flat abutment surface which is also generally perpendicular to the bearing surface. The lowermost locking margin of the tooth may also be formed downwardly to increase the angle of contact between the tooth and the workpiece. The existence of the formed locking margins on the teeth will form secondary springs in the system which will absorb excessive vibrations, or shocks, exhibited in the direction of retrograde motion, which would not ordinarily be absorbed by the strut-like configuration of the prior art teeth.

In addition to the secondary spring action, the upper edge region, formed as a flap sheared upwardly from the tooth will facilitate the camming of the cog over the teeth enabling the fastener member to be tightened a maximum amount for a locking device of this general type.

A further aspect of the invention is the frustoconical configuration of the teeth in composite extending outwardly from an annular body region of the lock washer. Such a structure will create yet a further spring in the system wherein the inner periphery of the washer is deflected downwardly bringing the teeth into interengagement with the cog, at which time there is substantial spring energy stored in the system. This initial spring energy stored in the system reduces the tendency of the threaded fastener to loosen.

The foregoing objects and advantages will become more apparent from the following detailed description when considered in connection with the accompanying drawings wherein:

FIG. 1 is a side elevational view of the nut and lock washer members of the invention in an unassembled condition;

FIG. 2 is a side elevational view of the nut and lock washer members of the invention in an assembled but unstressed condition;

FIG. 3 is a top plan view of the lock washer used in the invention;

FIG. 4 is a fragmentary enlarged plan view of one tooth of the lock washer contemplated by the invention;

FIGS. 5–7 are enlarged fragmentary side views illustrating the relationship between the edges of the lock washer teeth and the cogs of the fastener before tightening, during tightening and in a locked position.

Referring now to the drawings, it will be seen that the present invention contemplates the use of a rotary threaded fastener member, such as a nut 10, and an associated tooth lock washer member, such as member 12. These two members may be preassembled in a conventional fashion through the use of a tubular extension 24 on the bearing surface of the nut in cooperation with the upturned lip or rim 30 on the body of the lock washer. An assembly of this type is typically accomplished by telescopically associating rim 30 with the tube 24 followed by a swaging operation on the lower extremity of the tube. Such a preassembly thus permits relative rotational movement between the two bodies but prohibits axial separation.

As shown in FIG. 2, the nut member 10 and washer member 12 thus assembled form a preassembled unit 14 with the twisted teeth 32 of the washer situated beneath the clamping surface of the nut. The clamping surface is configured to include a plurality of generally radially extending cogs 18. Attention is directed to the side elevational configuration of the washer in FIGS. 1 and 2 showing that the teeth slope downwardly from the inner annular body 28 describing, in the composite, a frustoconical configuration. Such a configuration permits an initial spring energy to be stored in the system upon the application of torque to the fastener member, in addition to the energy available due to compression of the twisted teeth.

It will be further noted upon viewing FIGS. 1, 2, 5–7, that the cross-sectional configuration of each of the teeth is such as to form three distinct regions, namely, a pair of side marginal edge regions 34 and 36 and a central, generally flat, region 38. Due to the twisting of the tooth about a radial axis, the central region extends at a predetermined angle to a plane extending perpendicularly to the axis of the fastener. It will be noted that the uppermost radial edge region 34 is formed toward the bearing surface of the nut at an angle to the central region while the lowermost edge region 36 is formed downwardly toward a workpiece at still another angle to the central region. The upper marginal region 34 is preferably formed by shearing the tooth adjacent the root, as at 40, and bending a longitudinal section of the tooth upwardly.

The novel advantages and features of the configuration thus described will become apparent in a description of the operation of the device with particular reference to FIGS. 5-7. When the rotary member 10 is torqued down on a workpiece, the inner peripheral margin of the annular body 28 is compressed downwardly as a result of the frustoconical composite configuration of the teeth. This initial compression thus creates one level of spring energy formed in the system which becomes important in the cumulative effect accomplished by the invention. Upon such an initial compression, the upper edge regions 34 are now capable of interengagement with the cogs 18. As the member 10 continues in its tightening direction indicated by the arrow A in FIGS. 5 and 6, the ramp 20 deflects the teeth 32 to compression as shown in FIG. 6. The ramp 20 camming over the upturned marginal edge region 34 causes region 34 to rotate slightly in the counterclockwise direction relative to central region 38. The shearing formation of the upper region 34 thus creates a cantilever spring which is capable of deflecting relative to the remaining regions of the teeth. The ratcheting effect created by such a locking device can be accomplished with less effort than if the teeth were to be compressed by stressing the twisted configuration. When the unit has achieved the desired tightening load, the condition resembling that of FIG. 7 is present in the system. The cog-like configurations 18 permit the tooth to deflect upwardly into the valley portion of the cogs so that the upturned lip 34 is in direct and positive engagement with the surface 22 of the cog. Surface 22 is preferably in a plane which includes the axis of the fastener and which will extend substantially perpendicularly to the workpiece. Such a configuration will contribute to the effective locking engagement of the system in that there will be no tendency for the teeth to cam out from under the cog under excessive vibrations or loads in a retrograde direction B.

The novel S-shaped configuration of the cross section of the tooth and particularly the downturned region 36 prevents the dislodgement of the tooth from the workpiece under excessive vibrations, by virtue of the fact that the angle between the lower marginal locking edge region of the tooth and the workpiece is greater than in the prior art teeth. The S-shape, or upturned and downturned configuration of the locking regions, additionally creates secondary springs in the system which will accept high vibration, or retrograde forces applied directly to the tooth in a lateral direction, such as in the direction of arrow B. The upper flap or edge region 34 will absorb high unit vibration forces without directly applying these forces to the tooth. In prior art versions of such a device, the tooth acted as a strut which could tend to be dislodged under high unit forces of this type.

The upturned lip 34 provides an increase in axial height of the unstressed twisted teeth thus creating more torsional stress on the teeth for a given size and angle of twist when it is in the locked position of FIG. 7. The cumulative effect of the plurality of different spring energies provided by this invention thus creates a locking device of the type described, which provides a greater performance than prior art devices when high vibration forces are encountered. The conical configuration and upturned lip 34 provide a stored spring stress in the system even when the teeth are nested in the valley of the cogs.

While, for the purposes of disclosure, certain structural embodiments have been illustrated and described therein, it should be understood that the invention contemplates other modifications and changes without departing from the spirit and scope of the appended claims.

1. A fastener unit including, in combination, a rotary threaded fastener member having a central axis and a clamping surface extending generally perpendicularly to the axis, the clamping surface including a plurality of ratchet-type cogs spaced circumferentially thereabout, each cog including a camming surface extending at an acute angle in one direction to a plane extending perpendicular to the central axis, a substantially flat abutment surface extending upwardly from the camming surface to said plane and substantially perpendicular thereto, the bottommost edge of each cog extending in a plane substantially perpendicular to the central axis of the fastener, a sheet metal lock washer operatively associated with said clamping surface including an annular body concentric with the axis of the fastener member and a plurality of integral circumferentially spaced teeth, each tooth being twisted from its root to free extremity about an axis extending generally radially from the annular body, the teeth in composite being generally frustoconical in an unstressed state so that initial compressive forces on the unit will axially deflect the inner region of the lock washer downwardly creating a spring force in the unit while bringing the upper edges of each tooth into operative association with the perpendicularly disposed bottom edges of the cogs, the transverse cross-sectional configuration of each tooth, taken across said axis extending radially from the annular body, including a central region and a pair of side edge marginal regions, each marginal region being formed in opposite directions out of the plane of the central region with the marginal region closest to the clamping surface of the fastener member being formed upwardly toward said clamping surface, so as to extend generally perpendicular to said plane extending perpendicular to the central axis when the washer is in an unstressed condition, said marginal surface adjacent the upper edge being a radially extending tab sheared from the tooth adjacent the root thereof presenting a connection to the remaining portion of the lock washer along a line which is substantially radial thus creating a cantilever spring when engaged by the cogs.

2. The fastener unit of claim 1, wherein the fastener member is a nut with the lock washer preassembled thereto juxtaposed beneath the clamping surface.

* * * * *